United States Patent [19]

Cox et al.

[11] 3,757,966

[45] Sept. 11, 1973

[54] PALLETIZING APPARATUS

[75] Inventors: Thomas L. Cox, Beaumont; David G. Rodriguez, Vidor, both of Tex.

[73] Assignee: J & J Manufacturing Company, Beaumont, Tex.

[22] Filed: Mar. 12, 1971

[21] Appl. No.: 123,731

[52] U.S. Cl. ............ 214/6 P, 198/33 AB, 214/6 FS
[51] Int. Cl. ............................................. B65g 57/04
[58] Field of Search ................... 214/6 P, 6 H, 6 FS, 214/6 A, 6 DK, 6 G; 198/33 AB

[56] References Cited
UNITED STATES PATENTS

| | | | |
|---|---|---|---|
| 3,587,876 | 6/1971 | Dahlem ............................. | 214/6 P |
| 3,164,080 | 1/1965 | Miller, Jr. ......................... | 214/6 P X |
| 2,841,433 | 7/1958 | Pagdin et al. .................... | 214/6 FS X |
| 3,568,859 | 3/1971 | Truesdell ....................... | 198/33 AB X |
| 3,262,594 | 7/1966 | Teago ............................... | 214/6 A |
| 3,589,495 | 6/1971 | Pearne et al. ................... | 214/6 A X |
| 3,085,696 | 4/1963 | Stainforth et al. ............. | 214/6 P |
| 3,294,257 | 12/1966 | Davies et al. .................... | 214/6 P |
| 3,278,048 | 10/1966 | Bruce ............................... | 214/6 P |

FOREIGN PATENTS OR APPLICATIONS

| | | | |
|---|---|---|---|
| 1,154,218 | 6/1969 | Great Britain .................... | 214/6 P |

*Primary Examiner*—Robert A. Spar
*Attorney*—Arnold, White & Durkee, James L. Jackson, Tom Arnold, Frank S. Vaden, III and Robert A. White

[57] ABSTRACT

Apparatus for palletizing elongated generally rectangular articles according to the present invention comprises a frame work disposed adjacent a powered feed conveyor provided for conveying articles serially in linear manner to a shuttle conveyor carried by the frame work. The shuttle conveyor is operative, responsive to a tier pattern being developed and also responsive to the presence of an article, to selectively shift the article laterally from a neutral position to locate selected ones of the articles laterally with respect to the original line of movement thereof. Apparatus is provided to lift and rotate selected ones of the articles and reposition the artcles on a transfer conveyor also carried within the frame work. The articles are transported by the transfer to a tier forming section where they are collected into a tier of selected pattern. The tier is then lifted and transferred to a loading section where they are stacked either upon a pallet or upon a mirror image tier of articles previously stacked onto a pallet.

As the articles are engaged by vacuum heads carried by various article lifting rotating and transporting devices, plastic film from which the container is composed is pierced and the film container is evacuated to conform it to the article configuration and therefore facilitate neat and structurally secure palletizing of the tiers of articles.

4 Claims, 8 Drawing Figures

Patented Sept. 11, 1973
3,757,966
4 Sheets-Sheet 2
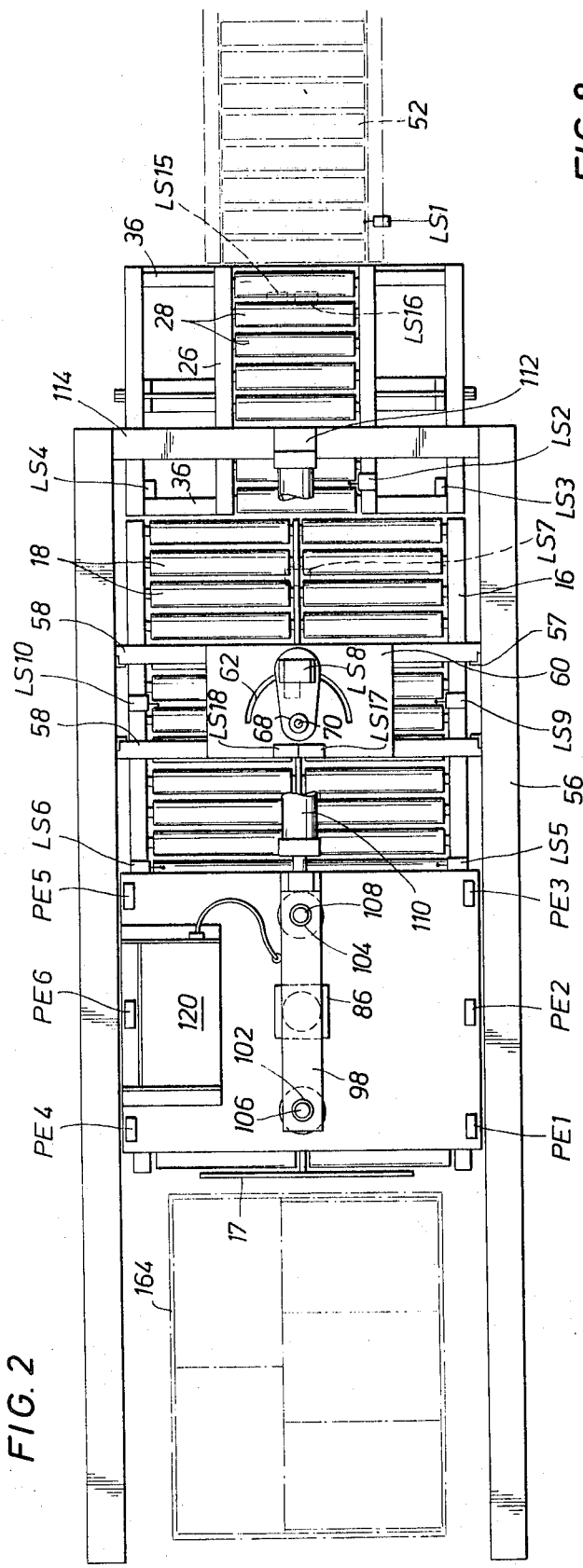
FIG. 2
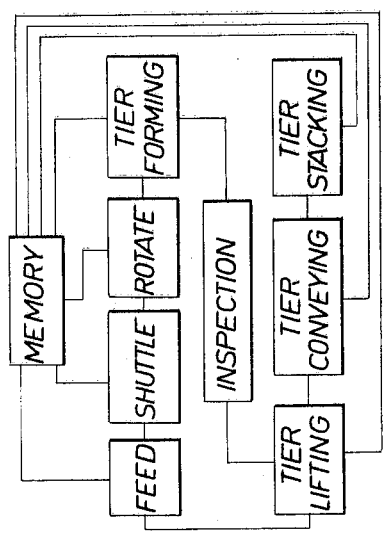
FIG. 8
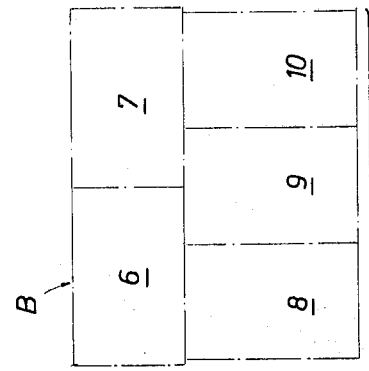
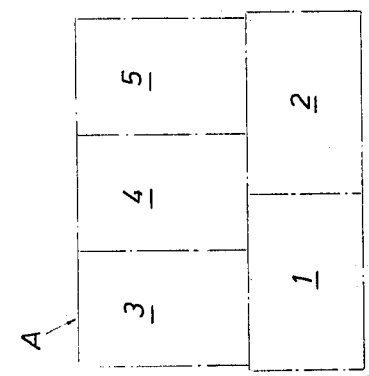
FIG. 4
Thomas L. Cox
David G. Rodriguez
INVENTORS
BY
Arnold, White & Durkee
ATTORNEYS

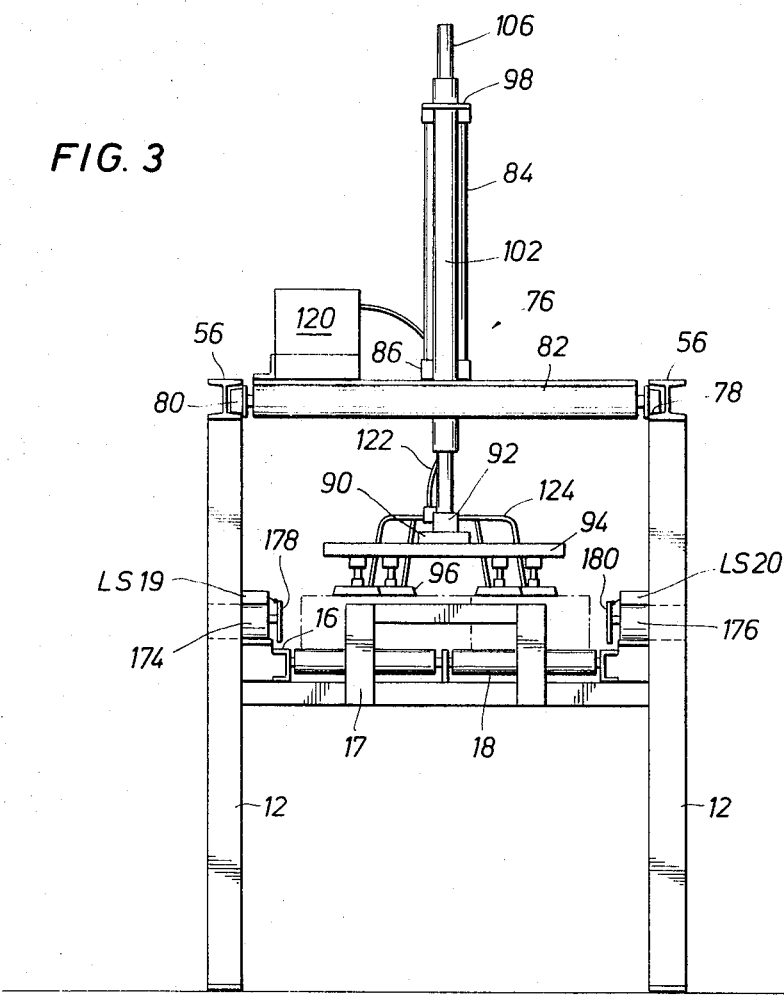
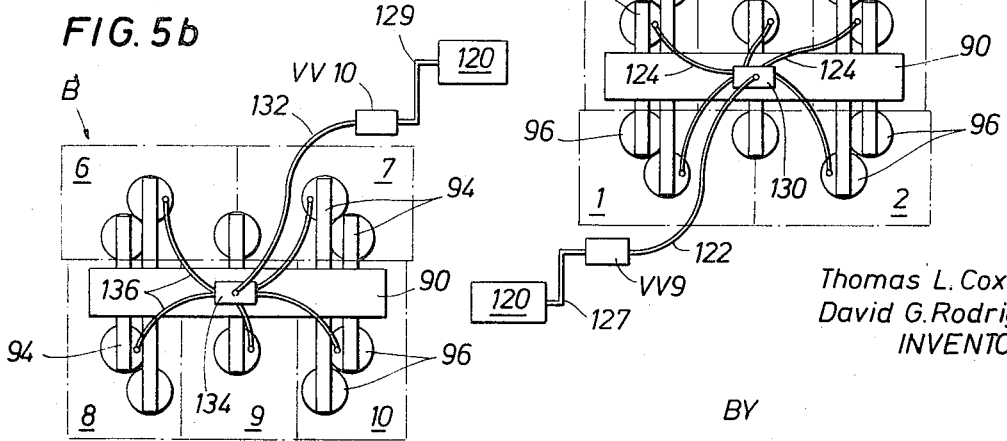

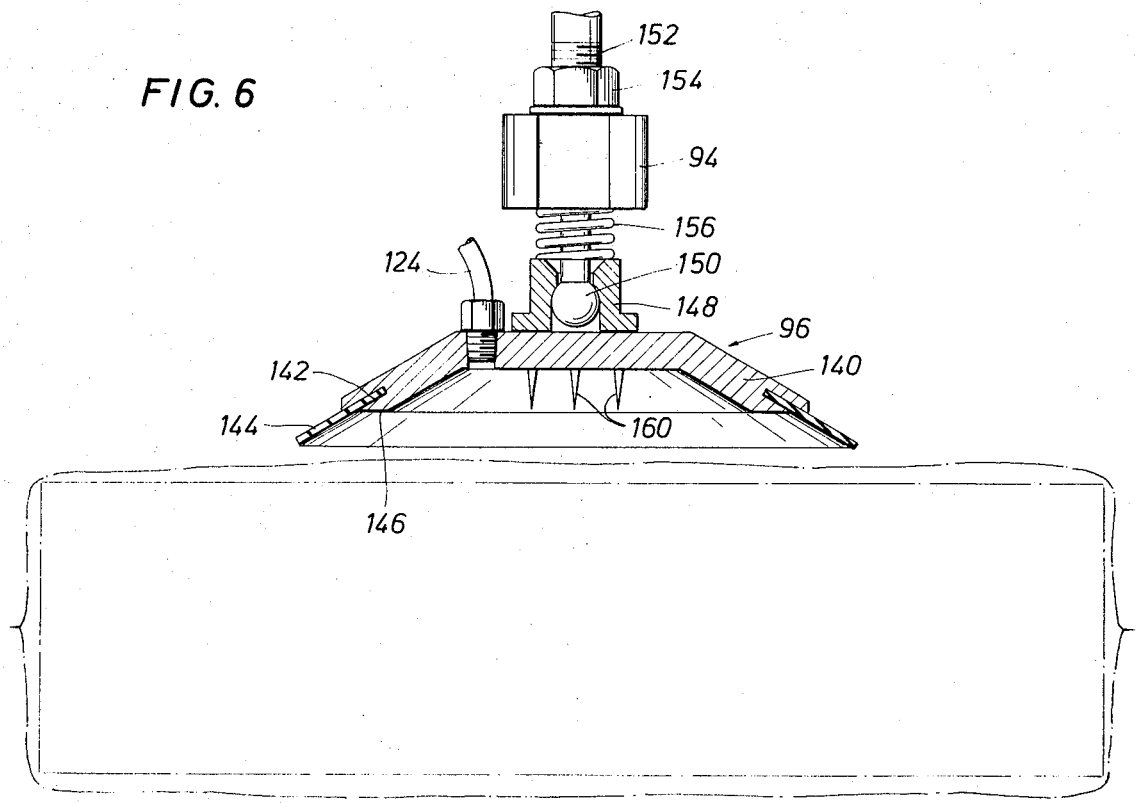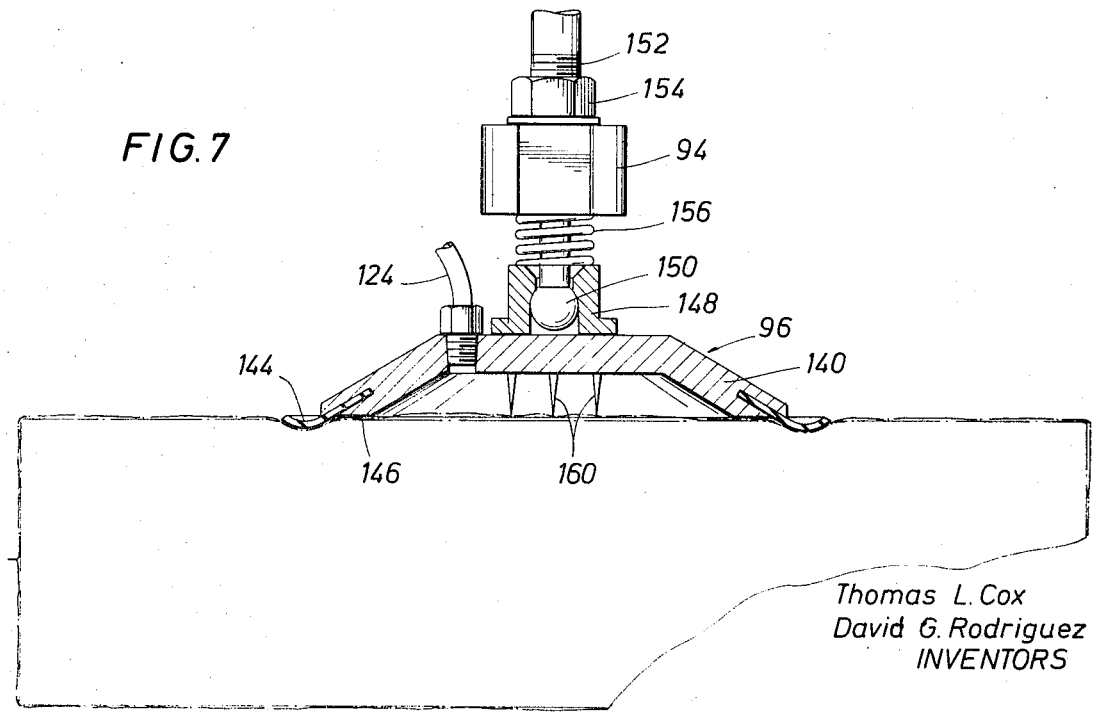

PALLETIZING APPARATUS

BACKGROUND OF THE INVENTION

This invention is directed generally to palletizing apparatus for generally rectangular elongated articles and more particularly the invention relates to the automatic arrangement for stacking tiers of articles onto a pallet in preselected pattern which articles are loosely enclosed within containers of plastic film.

Many articles of commerce are more conveniently handled by being arrnaged in tiers on pallets for storage and shipment. The arranging of the articles in layers on pallets is known as "palletizing" and generally involves the forming of the containers into certain patterns in the layers or tiers so that the articles in one tier are disposed in overlapping relation with the articles of the next tier immediately below and above thus securing the several layers together and stabilizing the pallet load.

Since most articles to be palletized are other than square, the patterning of the pallet layers is frequently accomplished by turning some of the articles in each layer 90° to the other article in the layer and controlling the turning so that the desired pattern is obtained.

Elongated articles such as generally rectangular rubber bales are frequently packaged in plastic film bags to prevent sticking of the bales as they are stacked onto pallets. The plastic bags or containers are frequently loosely disposed about the articles so that the loose plastic allows minor changes in article configuration without causing the container to burst. Such loose plastic film containers however frequently interfere with proper stacking of the articles to achieve a structurally stable palletized load. Since it is necessary to stack the articles into close neat tiers, it becomes important to prevent the loose plastic film from interfering as the bales are shifted, rotated or otherwise transported during arrangement thereof into a particular tier pattern.

Elongated articles form a more stable pallet load when stacked in overlapping relation and therefore it is generally desirable to rotate and shift some of the articles to form a tier arrangement that would facilitate stacking in overlapping mirror image relation. The articles may be rotated while resting on a conveyor if the articles are not easily damaged, but if susceptible to damage by such shifting it is frequently desirable to raise the article and rotate the same to achieve proper orientation or assembly thereof into desirable tier pattern. Articles may also be rotated relative to other articles of any given tier by conveying the articles onto a pallet that is supported by a movable or rotatable pallet support structure. Commercial acceptability of palletizing machines with movable pallet supports may be adversely affected by the cost of structure that is capable of supporting and moving a pallet load of extremely heavy nature. Moreover, it is difficult to achieve a desirable mirror image tier pattern when rotatable or sirable mirror image tier pattern when rotatable or movable pallet support apparatus is employed. Reference is made to U.S. Pats. Nos. to Sheehan, 3,381,828, and Miller, 3,045,802 in this regard. Other common apparatus for achieving article orientation are disclosed in U.S. Pats. Nos. to Stiles, 2,862,633, and Pagdin et al., 2,841,433.

It is therefore a primary object of this invention to provide novel palletizing apparatus that is capable of orienting elongated articles loosely enclosed within a plastic film container and stacking the same to mirror image tier patterns.

It is a further object of the present invention to provide novel palletizing apparatus that is capable of conforming plastic film containers to the configuration of the article being handled to facilitate orienting and stacking without interference by the plastic materials forming the article containers.

It is a further object of the present invention to provide a novel suction head structure for palletizing apparatus that is capable of engaging and lifting articles of irregular surface configuration.

Among the several objects of the present invention is noted the contemplation of a novel palletizing apparatus provided with a suction head structure capable of engaging and lifting articles enclosed within loose plastic film containers.

An even further object of the present invention concerns the provision of novel suction head lifting apparatus that is capable of simultaneously lifting and moving tiers of articles arranged in differing patterns.

It is another important object of this inventon to provide novel palletizing apparatus that is capable of functioning in response to regular or irregular production flow of articles to be palletized.

It is an even further object of this invention to provide novel palletizing apparatus that is capable of lifting and orienting selected articles to form particular tier patterns without causing damage to any of the articles being so lifted and oriented.

Another important object of the present invention includes the provision of novel palletizing apparatus capable of functioning automatically responsive to a tier pattern being formed and also responsive to the presence of articles being conveyed to the palletizing apparatus.

It is also an object of this invention to provide novel palletizing apparatus that is capable of being adjusted to produce tier patterns of various design.

Also among the various objects of the present invention is contemplated the provision of novel palletizing apparatus that positively assures arrangement of tiers of articles into proper orientation before transporting the tier and stacking the same onto an adjacent pallet.

Other and further objects, advantages and features of this invention will become apparent to one skilled in the art upon consideration of the written specification, the attached claims and the annexed drawings. The form of this invention, which will now be described in detail, illustrated the illustrates principles of the invention but it is to be understood that this detailed description is not to be taken as limiting the scope of the invention. Such description will be referred to by reference characters in the drawings in which:

FIG. 2 is a plan view of the palletizing apparatus of FIG. 1, particularly illustrating rotation of selected articles and arrangement of a particular tier pattern prior to movement of the tier for stacking purposes.

FIG. 3 is an end view of the palletizing apparatus of FIGS. 1 and 2.

FIG. 4 is a diagrammatic illustration of the tier patterns of alternating tiers of stacked articles that may be produced by the palletizing apparatus of this invention.

FIG. 5 is a diagrammatic illustration in plan of tier lifting apparatus illustrating vacuum heads that are energized to achieve lifting of alternating tiers of articles produced by the palletizing apparatus of this invention.

FIG. 6 is a sectional view of a vacuum head constructed in accordance with the present invention and illustrating positioning of the vacuum head above an article that is loosely enclosed within a container composed of plastic film.

FIG. 7 is a sectional view of the vacuum head of FIG. 6 illustrating operative engagement of the vacuum head with an article and conforming the loose plastic film containers to the article configuration before lifting thereof.

FIG. 8 is a schematic illustration of electrical control circuitry that may be employed to control the palletizing apparatus of the present invention.

BRIEF DESCRIPTION OF THE INVENTION

Figure 1:
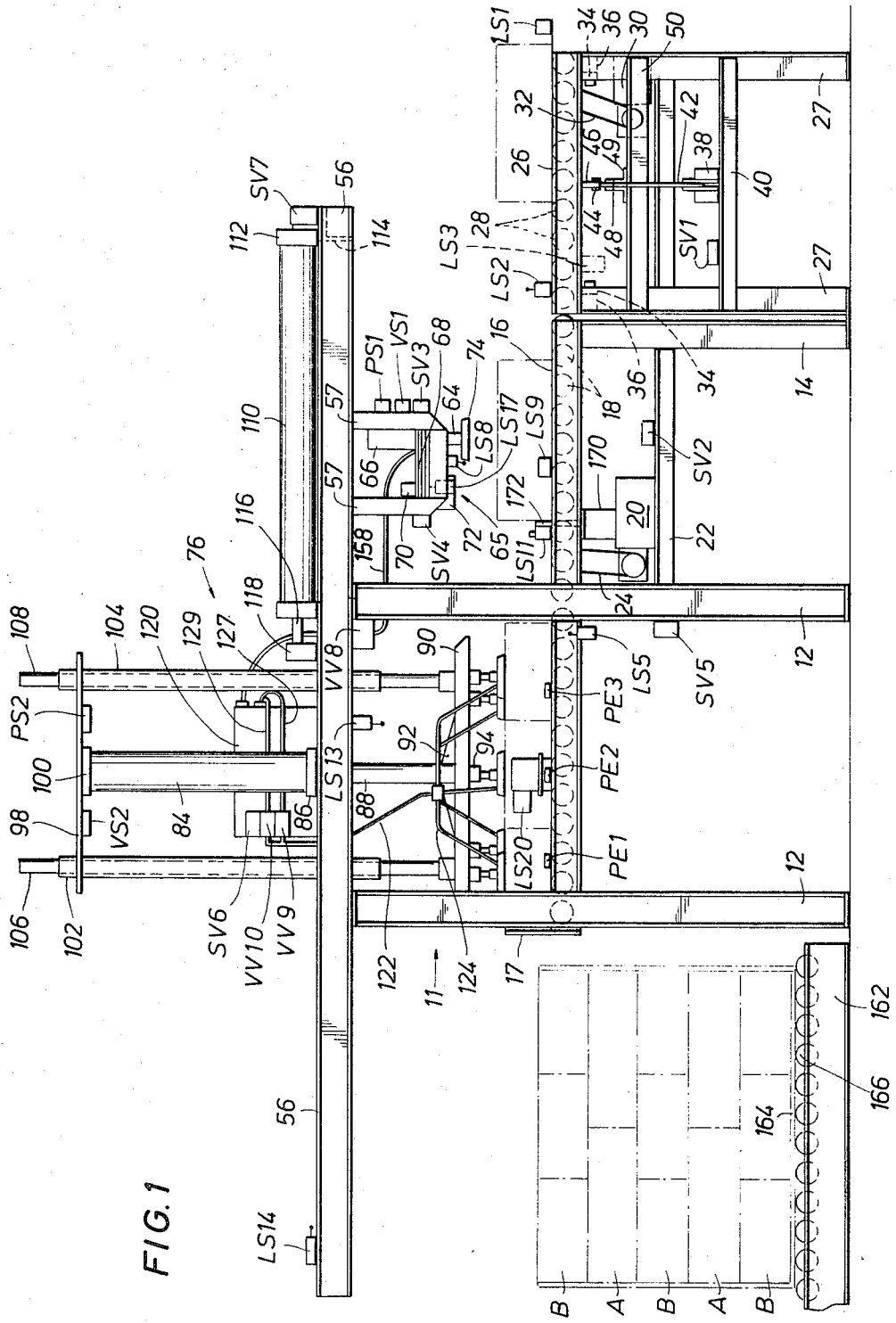
FIG. 1 is an elevational view of palletizing apparatus constructed in accordance with the present invention and illustrating transfer of elongated generally rectangular articles therethrough.

Briefly summarized the invention concerns the provision of a feed conveyor that is capable of conveying articles linearly from a production facility or the like to apparatus for palletizing the articles into mirror image alternating tiers of sufficient structural integrity to withstand jarring and shifting that are prevalent when pallets of stacked articles are transported to or from storage and transported by various commercial conveyances to a final destination. Palletizing apparatus according to this invention may include a shuttle conveyor, capable of receiving articles from the feed conveyor and functioning in response to the tier pattern being developed and also in response to the presence of an article, to shift the article laterally of its original line of travel or to move the article in its line of travel to a transfer conveyor carried by the frame work of the palletizing apparatus. The transfer conveyor is also operative, responsive to the tier pattern being developed and responsive to the presence of an article received from the shuttle conveyor, to either continue transfer of the article to a tier assembly station or to position selected ones of the articles for rotation as determined by the tier pattern. Apparatus may be provided for rotating selected articles and repositioning them on the transfer conveyor after which the transfer conveyor will be energized to move the rotated articles into proper position at the tier assembly station. After the proper number of articles have been assembled in properly oriented position at the tier assembly station, tier lifting structure that functions, responsive to apparatus that determines proper positioning of the articles, to lift the assemblied tier and transport it to a loading section where the tier is lowered into place on a pallet in a container or on other tiers of articles resting on the pallet or in a container.

The palletizing apparatus of this invention is capable of stacking assembled articles into mirror image tiers upon a pallet to assure optimum structural integrity of the palletized load.

DETAILED DESCRIPTION OF PREFERRED EMBODIMENT

Referring now to the drawings for a more detailed description of the invention, palletizing apparatus, illustrated generally at 11, may include frame work having main vertical supports 12 which may be I-beams, H-beams or the like cooperating with secondary vertical support 14 to support a transfer conveyor 16 in substantially horizontal position relative thereto. The transfer conveyor 16 is provided with a plurality of rollers 18 that are rotatably powered by a rotary motor 20 supported by a transverse platform 22 connected to vertical uprights 12 and 14 in any desirable manner. The motor 20 is most conveniently a rotary electrically powered motor operatively connected by a drive belt or drive chain 24 to a roller drive of the transfer conveyor, but within the scope of this invention, the motor 30 may be driven by any other desirable motive power such as hydraulic or pneumatic fluid, for example, without departing from the spirit or scope of this invention.

A shuttle conveyor 26 may be operatively carried by the frame work 11 if desired or, as illustrated, may be carried by separate vertical supports 27 that position the shuttle conveyor in substantially coextensive relation with the transfer conveyor 16.

The shuttle conveyor 26 includes a plurality of rolls 28 driven by a rotary motor 30 drivingly connected to the rolls by a belt or chain drive member 32. Motor 30 is likewise capable of being powered in any desirable manner. Cam followers 34 are secured to the movable shuttle conveyor 26 and are received within cam tracks 36 secured to the upper extremities of vertical uprights 27. The motor 30 if desired may be movable with the shuttle conveyor 26 or, in the alternative, may be immovably supported by the shuttle conveyor frame work and operatively connected in any desirable manner to impart rotation to drive rollers 28.

The shuttle conveyor 26 is normally disposed in a neutral position, as illustrated in FIG. 2, and is capable of moving laterally in either direction within limits defined by the length of the cam tracks 36. For the purpose of imparting lateral movement to shuttle conveyor 26, a fluid motor 38 may be secured to a transverse structural member 40 to impart movement to a lever arm 42 connected at 44 to a depending connecting member 46 of the shuttle conveyor and pivoted at 48 between vertical pivot supports 49 secured to a transverse structural member 50. As the fluid motor 38, which may be either a linear pneumatic or hydraulic motor, is energized, the lever arm 42 will be rotated about the pivot 48 and through its connection with shuttle conveyor 26 will cause the shuttle conveyor to move laterally to a position aligning an article carried thereon with a particular portion of the transfer conveyor 16. Operative of shuttle conveyor 26 will be discussed in detail hereinbelow concerning patterned accumulation of articles at a tier forming and lifting station and defined on the transfer conveyor 16.

For the purpose of conveying articles from a production facility, not shown, to the palletizing apparatus of this invention a feed conveyor shown in broken line at 52 may be employed to move articles in linear manner to the shuttle conveyor 26. The feed conveyor 52 may be any commercially acceptable conveyor structure, it only being necessary that articles are conveyed serially in properly oriented manner to the shuttle conveyor and that the shuttle conveyor be energized as articles are moved in close proximity thereto by the feed conveyor. For this purpose a limit switch LS–1 is carried by feed conveyor 52 and is actuated by an article being moved on the feed conveyor to energize motor 30 of the shuttle conveyor 26 to cause drive rollers 28 to begin rotating.

The frame work of palletizing apparatus 11 may include a pair of horizontal structural members 56 supporting a plurality of vertical hangers 57 having transverse horizontal structural elements 58 secured to the lower extremities thereof. A rotator platform 60 is carried in fixed relation by structural elements 58 and includes a generally semicircular arcuate opening 62 through which the operating shaft 64 of a fluid motor 66 extends. The fluid motor 66, which may be a linear motor powered by pneumatic or hydraulic fluid, is appropriately secured to an arm 68 that is journaled for pivotable rotation about a pivot 70. A rotary actuator 72 is disposed beneath the rotary platform 60 and is capable, when energized, of driving the arm 68 from a neutral position as illustrated in FIG. 2 either clockwise or counterclockwise through an arc of 90° as determined by the arcuate opening.

A vacuum head 74, which may be of the configuration illustrated particularly in FIGS. 6 and 7, may be secured to the lower extremity of the actuating shaft 64 of motor 66 and is disposed for contacting an elongated rectangular article that may be disposed there beneath in position as illustrated in broken lines. Fluid motor 66 is operative to move the vacuum head 74 into engagement with the article and to lift the article from the transfer conveyor 16 and, depending upon the tier pattern being formed, rotating the article clockwise or counterclockwise 90° and repositioning the article upon the transfer conveyor. Controlled actuation of the article rotating mechanism 65 will be discussed below in conjunction with movement of articles through the palletizing apparatus to achieve properly oriented tiers for subsequent stacking.

As tiers of articles are accumulated at a tier lifting station defined by the terminal portion of transfer conveyor 16, a tier lifting mechanism, illustrated generally at 76, may be provided to lift completed tiers of articles and to transport the same laterally for stacking onto a pallet or container provided to receive the same. The horizontal structural members 56 may appropriately be of "I" or "H" beam configuration appropriately oriented in such manner as to define tracks 78 that receive a plurality of supporting cam followers or rollers 80 journaled for supporting relationship with a tier transporting carriage 82 as best illustrated in FIG. 3. A fluid motor 84 that may be a linear hydraulic or pneumatic motor, as desired, may be provided with its base 86 secured to the transporting carriage 82 while the extendable actuating shaft 88 of the fluid motor extends through the transporting carriage downwardly into connection with a transverse channel 90. If desired, a plurality of gussets 92 may be secured to shaft 88 and channel 90 in any desirable manner to provide a connection of optimum strength and stability.

A plurality of elongated vacuum head support bars 94 may be secured to the lower extremity of channel 90 in essentially parallel relation. Each of the support bars is capable of supporting one or more vacuum heads 96 that may be essentially of the configuration illustrated in FIGS. 6 and 7.

For the purpose of guiding the tier lifting mechanism 76 during reciprocation thereof, a support plate 98 may be secured to the cap 100 of the fluid motor 84. Guide sleeves 102 and 104 may be secured adjacent their upper extremities adjacent the extremities of support plate 98 and may further be secured adjacent the lower extremities thereof to the transporting carriage 82.

Guide rods 106 and 108 may extend through the guide sleeves 102 and 104 respectively and may be secured at the lower extremities thereof to the transverse channel 90 of the tier lifting mechanism. Thus, the tier lifting mechanism is guided against lateral shifting or rotation by the guide sleeves 102 and 104 and serves to properly position a completed tier of articles upon a pallet disposed within the tier loading area.

Lateral movement of the transporting carriage 82 may be induced by a horizontally disposed fluid motor 110 having the base portion 112 thereof secured to a transverse structural member 114 retained by horizontal structural elements 56. The actuating stem 116 of the fluid motor 110 may be secured to the tier carriage 82 by a connecting bracket 118 thereby enabling fluid motor 110, upon extension of the actuating stem 116, to impart lateral movement of the tier lifting carriage, thereby moving the carriage from the tier lifting station to the tier loading station. After the articles have been transported to the tier loading section, they may be lowered by the motor 84 into engagement with a waiting pallet or container or may be lowered into engagement with a previously deposited tier of properly arranged articles at which time the tier is released by the vacuum heads and the tier lifting mechanism is raised by the fluid motor 84 and carriage 82 is shifted by fluid motor 110 back to the tier assembly section.

A vacuum pump 120, or other appropriate source of subatmospheric pressure, may be disposed in fixed relation with the tier carriage 82 and disposed in fluid communication with vacuum heads 96 through a supply conduit 122 and branch conduits 124 under control of vacuum valves VV-9 or VV-10 that are selectively energized to communicate the source of vacuum to selected ones of the vacuum heads 96.

Referring now to FIGS. 5a and 5b, which diagrammatically illustrate positioning of the various vacuum heads, it will become apparent that selected ones of the vacuum heads are energized depending upon the particular tier pattern being developed. FIG. 5a discloses an article tier pattern characterized generally as "A" and illustrates diagrammatically the vacuum heads necessary for proper lifting of tier pattern "A."

It should be borne in mind that the tier lifting apparatus is provided with a sufficient number of vacuum heads to enable the lifting apparatus to engage and properly lift the articles of either tier pattern "A" or tier patter "B." For purpose of simplicity, however, to facilitate ready understanding of the present invention, FIG. 5a illustrates only the vacuum conduit structure necessary for activation of vacuum heads necessary for limiting the articles of tier pattern "A" while FIG. 5a illustrates only the vacuum conduit structure necessary for activating the vacuum heads that lift the articles of tier pattern "D." Also for purpose of simplicity, the tier lifting apparatus is illustrated as including only the vacuum conduit structures necessary for lifting tier pattern "A," it being apparent from this disclosure that the tier lifting apparatus also includes the vacuum conduit structure necessary for lifting tier pattern "B."

Referring now particularly to FIG. 5a, a vacuum supply conduit 122 is illustrated as extending from vacuum valve VV-9 to a manifold 130. A plurality of branch conduits 124 extend from the manifold to those of the vacuum heads 96 that are disposed centrally of each of the associated articles of tier pattern "A." As discussed above, the vacuum valve VV–9 is communicated with the vacuum pump 120 through a conduit 127.

With reference now to FIG. 5a, a conduit 129 communicates the vacuum pump 120 with a vacuum supply conduit 132 under control of the vacuum valve VV–10. The vacuum supply conduit is connected to a manifold 134 communicating the source of vacuum with a plurality of branch conduits 136 connected in any desirable manner to those of the vacuum heads 96 that are disposed centrally of associated articles composing tier pattern "B."

Referring now particularly to FIGS. 6 and 7, a vacuum head illustrated generally at 96 according to the present invention includes an inverted dish-like body structure 140 having an annular groove 142 of generally frusto-conical configuration formed therein. A generally frusto-conical flexible skirt 144 is secured within the groove 142 and defines the lower peripheral portion of the vacuum head. The flexible skirt 144 may be composed of any one of a number of suitable rubber or rubber-like materials that may be bonded or molded or otherwise attached to the rigid plate-like body structure of the vacuum head. The body structure 140 may be provided with a generally planar annular surface 146 disposed for contact with an article in the manner illustrated in FIG. 7. The resilient skirt 144, upon engagement with an article, may be deformed as illustrated in FIG. 7 in order to form the peripheral portion of the vacuum head to the article and thereby establish a secure sealed relation therewith.

A hub member 148 may be disposed about a generally spherical portion 150 of a support shaft 152 and may be secured to the body 140 in such manner as to define a universal connection with the shaft 152. The threaded shaft 152 extends through an appropriate aperture, formed within one of the transverse bars 94, as illustrated particularly in FIGS. 1 and 3, and is secured by a nut 154 received by the threaded shaft 152. A compression spring 156 surrounds the shaft 152 and is interposed between the hub 148 and bar 94 to allow limited movement of the head 96 toward the bar 94 to compensate for dimensional differences in the various articles that may be simultaneously engaged by the plurality of vacuum heads 91. A vacuum supply conduit 124, which may be a branch conduit extending from a manifold, as illustrated in FIG. 5, or a single vacuum supply conduit, as shown at 158 in FIG. 1, may be connected to the body 140 by threading as illustrated or by any other acceptable method of connection.

As discussed above, a loose plastic film container in which an article such as a bale of rubber is enclosed, may interfere with proper handling, orientation and stacking of the article onto pallet devices. For the purposes of eliminating the problem caused by loose plastic material of this nature, the vacuum head may be provided with at least one and preferably a plurality of rather sharp projections 160 that may engage the plastic material as the vacuum head is moved into contacting relation with an article that is to be lifted. In FIG. 6, an article is shown to be enclosed within a loose plastic film container. As the vaccuum head moves to engaging relation with the article, as illustrated in FIG. 7, the projections 160 pierce the plastic film material thereby communicating the interior of the plastic container with the source of sub-atmospheric pressure applied through conduit 124. When this occurs, the plastic container will be evacuated thereby causing the plastic container to adhere closely to the article in the manner illustrated in FIG. 7.

The plastic container, when drawing into conforming relation with the article in the manner illustrated in FIG. 7, will not interfere with the ability of the palletizing apparatus to place the articles into properly composed tiers or otherwise interfere with stacking of the articles onto pallets.

A loading section is defined beneath the tracks 56 and includes a conveyor 162 capable of supporting a pallet or container 164 as the same is being loaded with properly oriented mirror image tiers of articles. A plurality of rolls 166, which may or may not be powered, as desired, may be provided to facilitate transfer of a loaded pallet from the loading section to further handling or storing apparatus. Also, if desired, the palletizing apparatus may be provided with means to dispense containers or pallets at the tier loading area immediately upon movement of a loaded pallet or container from the tier loading area. Such pallet or container dispensing apparatus is not illustrated, it being obvious that such structure is commercially available.

The palletizing apparatus of this invention may be controlled by limit switches, step switches, latching relays, and the like that define an electrical sequence control capable of determining the article tier pattern to be developed. Designation location and function of the various electrical control apparatus will be discussed in conjunction with transfer of articles through the palletizing apparatus and arrangement of tiers of articles such as indicated in FIG. 5.

To develop the tier pattern "A," identified in FIG. 5a, a generally rectangular article, such as a bale of rubber, for example, will be conveyed from a production facility by the feed conveyor 52 to the palletizing apparatus. As the article reaches the terminal portion of the feed conveyor 52, it will engage limit switch LS-1 which functions to energize the motor 30 to drive the rolls 28 thereby conveying the article into contacting relation with limit switch LS–2 mounted on the shuttle conveyor. After the article has cleared the feed conveyor 52, the feed conveyor may be caused to stop until such time as another article is placed thereon for transfer to the shuttle conveyor. Of course the feed conveyor may be a continuously powered mechanism if desired. Movement of the article into contacting relation with limit switch LS–2 on the shuttle conveyor will stop the rolls of the shuttle conveyor and actuate linear motor 38 that will, through its lever arm 42, cause movement of the shuttle conveyor to the left, or downwardly as illustrated in FIG. 2, on cam followers 34 guided by tracks 36. When the shuttle transfer conveyor 26 reaches the terminal point of its movement to the left, the shuttle conveyor will actuate a limit switch LS–3 which will start the motor 30 of the shuttle transfer conveyor thereby causing the rolls 28 again to be rotated to cause movement of the article toward the transfer conveyor 16. Limit switch LS–3 also energizes the motor 20 of transfer conveyor 16 thereby imparting driving movement to rolls 18 to cause movement of the article into the tier forming station beneath the tier lifting mechanism 76 where the first article will engage the abutment 17. The second article, identified by reference character 2 in FIG. 4, will be conveyed from the feed conveyor 52 to the shuttle conveyor 26, which upon discharging the first article, has been caused to return to its neutral position as illustrated in FIG. 2.

The second article will move onto the shuttle conveyor 26 in similar manner as discussed above regarding the first article and will again induce shifting of the shuttle conveyor to the left of the line of article travel, energizing limit switch LS-3, that again energizes the motor 30 imparting movement to drive rolls 18 and allowing the second article to move into abutting relation with the first article. Abutment 17 of the transfer conveyor will support the first and second articles maintaining them in the proper position to form a tier of selected pattern.

The third article identified by reference character 3 in FIG. 4 will move from the feed conveyor 52 onto the neutrally positioned shuttle conveyor 26 in the manner discussed above. The third article will engage override the shuttle transfer conveyor limit switch LS-2 since this limit switch will have been deactivated by a stepping switch or other suitable counting mechanism that may of course be of conventional nature. The third hole will continue to be driven by the shuttle transfer conveyor rolls 28 and the transfer conveyor rolls 18 until the third article contacts and actuates a limit switch LS-7 located on the initial portion of the transfer conveyor 16. Limit switch LS-7, when so activated, energizes a motor 170 which raises a stop 172 that is operative to position the third article in centered position at an article rotating station below the vacuum head 74 of the article rotating mechanism illustrated generally at 65. Motor 170 may be a pneumatic or hydraulic linear motor, as illustrated in FIG. 1, or in the alternative may be of any other acceptable motor type within the scope and spirit of the present application.

As the third article engages the stop 172, the article will actuate limit switch LS-11, carried by the stop structure, which is operative to deenergize the motor 20 of transfer conveyor 16 thereby ceasing rotation of the drive rolls 18. Switch LS-11 simultaneously energizes the linear motor 66 thereby driving the stem 64 and vacuum head 74 downwardly into engaging relation with the third article. Upon contacting the third article, the vacuum head will apply predetermined mechanical pressure, determined by the pressure setting of a pressure switch PS-1, at which time a vacuum switch VS-1 will be actuated thereby causing a vacuum valve VV-8 controlled thereby to communicate subatmospheric pressure produced by pump 120 to the vacuum head 74. After the vacuum has reached a predetermined pressure setting determined by vacuum switch VS-1, the fluid motor 66 will be energized thereby retracting the stem 64 vacuum head 74 and lifting the third article. The third article will be raised sufficiently to cause a limit switch LS-8, carried by the article rotating mechanism, to be engaged by the vacuum head 74, causing the limit switch to energize the rotary actuating motor 72, and thereby induce rotation of the arm 68 about pivot 72 in counterclockwise manner 90° to the terminal portion of arcuate opening 62. The rotary arm or plate 68, upon rotating 90° counterclockwise, actuates a limit switch LS-18 that causes extension of the linear motor 66 and lowers the third article onto the rolls 18 of transfer conveyor 16. A limit switch LS-10, mounted on transfer conveyor 16, will be engaged by the article as the third article contacts the rolls 18 and this limit switch will induce actuation of vacuum valve VV-8 causing the vacuum head 74 to release its attachement with the third article. Limit switch LS-10 when engaged also induces retraction of the linear motor 66 thereby returning the vacuum head 74 toward the initial position thereof. Limit switch LS-10 also induces the rotary actuator motor 72 to impart clockwise movement to arm 68 thereby moving the vacuum head back to the neutral position thereof. The motor 20 of transfer conveyor 16 will also be energized at this time to induce rotary movement to rolls 18 upon engagement of limit switch LS-10 by the third article. After the third article has been released by the vacuum head, it will be moved forward by the rotating rolls 18 to the tier lifting station where it will engage abutment 17 which properly positions the third article in relation to the other articles of tier pattern "A."

The fourth and fifth articles of tier pattern "A" will be delivered from the feed conveyor to the shuttle conveyor and will be rotated by the article rotating mechanism 65 and transferred to the tier lifting station in similar manner as discussed above in regard to handling of the third article by the palletizing apparatus.

After the tier pattern "A" has been completed, means may be provided to ascertain proper positioning of the articles of a tier before the tier is transported to a pallet loading area which means may take the form of six photoelectric cells PE-1 through PE-6 which will be properly actuated if all articles are present and are properly positioned. After the photoelectric cells or other such means have determined the presence of all articles within an appropriate tier, a solenoid valve SV-5 will be actuated by the photoelectric cell circuit thereby causing energization of a pair of article positioners 174 and 176, best shown in FIG. 3, that move elongated plates 178 and 180 into engaging relationship with adjacent articles to achieve any minor shifting thereof that is necessary to perfectly align the tier pattern "A" in centered relation on the transfer conveyor rolls at the tier lifting station.

The article positioners 178 and 180, upon extending to the aligning position thereof, may be caused to actuate limit switches LS-19 and LS-20, which cooperatively actuate the fluid motor 84 of tier lifting mechanism 76 thereby causing the tier lifting mechanism to move the vacuum heads 96 thereof into engaging relation with the articles of tier pattern "A." The tier lifting mechanism bears against the articles with sufficient mechanical pressure to deform the flexible skirts of the vacuum heads sufficiently to allow engagement between the planar surfaces 146 of the vacuum heads and the upper surface of the articles to be lifted. As discussed above, the compression springs of the various vacuum heads allow each of the vacuum heads to properly contact the associated articles even though the articles may be of slightly irregular height. After a predetermined mechanical pressure has been established, a pressure switch PS-2 will be activated and will cause actuating of a vacuum switch VS-2, mounted on support plate 24, which actuates vacuum valve VV-9 in such manner as to communicate the source of subatmospheric pressure from continuously running vacuum pump 120 through the appropriate supply conduit and branch conduits to the vacuum heads disposed in centered relation with the articles of the particular tier pattern to be lifted.

For the purpose of lifting the particular articles of the tier pattern indicated at "A" and "B" in FIGS. 5a and 5b, the tier lifting apparatus may be provided with 10 vacuum heads, five heads being employed for lifting tier pattern "A" and the remaining five heads to be utilized during the lifting operations concerning tier pattern "B." The particular vacuum heads for either of the tier patterns "A" or "B" are selected by an electrical memory circiut of conventional nature which, as indicated above, may be a simple electrical stepping switch circuit which actuates either of the vacuum valves VV–9 or VV–10 depending upon the tier pattern to be lifted.

After the sub-atmospheric pressure being applied between the vacuum heads and the articles reaches a predetermined pressure setting, as determined by vacuum switch VS–2, the vacuum switch will induce actuation of the fluid motor 84 thereby raising the actuating stem 88 and lifting the vacuum heads and attached articles of the entire tier. The tier lifting apparatus will be raised until a limit switch LS–13 is contacted and functions to energize the linear carriage motor 110 which extends the drive stem 116 and induces movement of the carriage 82 to the left as illustrated in FIG. 1, thereby positioning the lifted tier immediately above a container or pallet 164 disposed at the tier loading station. When this position has been reached, the carriage 82 will contact a limit switch LS–14 carried by one of the horizontal supports 56 which causes movement of the linear motor 110 to cease and simultaneously actuates the fluid motor 84 to cause extension of shaft 88 thereby lowering the articles onto a pallet into a container or onto other articles positioned on the pallet or in the container. At this time, the fluid motor 84 meets resistance and is signaled to stop its downward movement by pressure switch PS–2, also mounted on the support plate 24. Pressure switch PS–2 transmits an appropriate signal to vacuum switch VS–2 actuating the vacuum valve VV–9, causing the vacuum heads to release their connection with the articles of tier pattern "A." The vacuum switch VS–2 simultaneously induces the fluid motor 84 to retract thereby raising the tier lifting apparatus which, when fully retracted, will actuate a limit switch LS–13 that causes the fluid motor 110 to retract its actuating stem 116 thereby moving the carriage 82 back to its position over the tier lifting station.

Tier pattern "B" is formed by the palletizing apparatus responsive to the memory circuit of the apparatus which may, for example, take the form of a simple conventional stepping switch, or any other desirable electrical structure that establishes the article handling sequence of the apparatus.

The sixth and seventh articles will be conveyed from the production facility by feed conveyor 52 to shuttle conveyor 26, which at that time will be disposed in its neutral position, as illustrated in FIG. 2. Upon reaching the terminal portion of feed conveyor 52, the sixth article will actuate limit switch LS–1 thereby energizing the motor 30 to shuttle conveyor 26 to induce rotation of the drive rolls 28 thereby receiving and conveying the article linearly until the article engages limit switch LS–2 which causes deenergization of the shuttle transfer conveyor motor 30 thereby stopping the rolls 28 with the article positioned on the shuttle conveyor. Limit switch LS–2 is also operative, when engaged by the article, to induce actuation of the solenoid valve SV–1, thereby causing the linear motor 38 to be energized in such manner as to move the shuttle transfer conveyor 26 to the right of the line of article movement or upwardly, as illustrated in FIG. 2, causing the shuttle conveyor to actuate limit switch LS–4 which is in turn operative to deenergize the linear motor 38 stopping the shuttle transfer conveyor at the right extremity at its travel. Limit switch LS–4 simultaneously energizes motors 30 and 20 of the shuttle and transfer conveyors, respectively, causing drive rolls 28 and 18 to convey the article in linear manner to the tier lifting station where its movement is stopped by the abutment 17 to properly position the article relative to the tier lifting apparatus.

Article 7 of tier pattern "B" is conveyed from the production facility by feed conveyor 52 and is received and handled by the palletizing apparatus in similar manner as discussed above regarding handling of the sixth article.

The eighth article will be conveyed to the shuttle conveyor 26 by feed conveyor 52 and engages limit switch LS–1 in the manner discussed above, thereby energizing motor 30 of the shuttle conveyor 26 to start rotation of drive rolls 28. The drive rolls 28 will convey the eighth article onto the shuttle conveyor, which will be disposed in the neutral position thereof, as illustrated in FIG. 2. Under control of the memory circuit, limit switch LS–2 will be deactivated and the motor 30 of transfer conveyor 16 will be energized imparting rotation to drive rolls 18. The article will override limit switch LS–2 and will be driven onto the transfer conveyor 16 in the manner discussed above in regard to the third, fourth and fifth articles of tier pattern "A."

Linear motor 170 will have become energized by the memory circuit thereby raising a movable stop 172 that is engaged by the eighth article to properly locate the article below vacuum head 74. The article simultaneously contacts limit switch LS–11 which energizes solenoid valve SV–3 which causes activation of the linear motor 66 to drive the shaft 64 and vacuum head 74 downwardly into engagement with the eighth article located therebeneath.

As the fluid motor 66 fully extends the vacuum head 74 will bear against the article with sufficient mechanical pressure to cause the pressure switch PS–1 to energize vacuum switch VS–1, which in turn opens vacuum valve VV–8, thereby communicating the source of sub-atmospheric pressure with the vacuum head 74. Vacuum valves VV–9 and VV–10 will be maintained in the closed condition thereof in response to energization of vacuum switch VS–2. When the vacuum attraction between vacuum head 74 and the eighth article is of sufficient magnitude to secure the article to the vacuum head, vacuum switch VS–1 will deenergize solenoid valve SV–3, thereby inducing the fluid motor 66 to retract which cause raising of the vacuum head and the article.

As the fluid motor 66 retracts, limit switch LS–8 will be contacted by the vacuum head 74 and will deenergize solenoid valve SV–2 and simultaneously energize solenoid valve SV–4 which, under control of the memory circuit, is effective to induce controlled rotation of rotary actuator 72 causing clockwise rotation of arm 68 thereby moving the vacuum head 74 through an arc of 90° defined by arcuate opening 62 in platform 60.

As the article rotating mechanism reaches the terminal portion of its rotary movement the limit switch LS–17 will be actuated thereby energizing solenoid valve SV–3 which energizes the linear motor 66 causing movement of shaft 64 and vacuum head 74 downwardly to lower the article onto the transfer conveyor 16. Upon engaging the transfer conveyor, the article also actuates limit switch LS–9 thereby inducing movement of the vacuum valve VV–8 to a position breaking communication of the vacuum supply with vacuum head 74 and releasing the connection of vacuum head 74 with the article. Limit switch LS-9 also simultaneously energizes pressure switch PS-1 and solenoid valves SV-3 and SV-4 which induce the linear motor 66 to raise vacuum head 74 to the neutral position thereof. As the vacuum head 74 is being raised and rotated back to the neutral position thereof, limit switch LS-9 will simultaneously induce energization of transfer conveyor motor 20 thereby starting the rolls 18 to convey the eighth article linearly into engagement with abutment 17 and to advance a following article onto the palletizing apparatus. Articles 9 and 10 will be transferred, rotated clockwise and moved into proper position to form the tier pattern "B" in similar manner as discussed above regarding the eighth article.

After tier "B" has been completed at the tier forming station as determined by photoelectric circuit including photoelectric cells PE-1 through PE-6 which, after making such determination, will energize solenoid valve SV-5 that in turn will energize positioner motors 174 and 176 causing article positioners 178 and 180 to move outwardly to achieve any minor alignment or centering necessary to properly position each of the articles beneath the appropriate vacuum head of the tier lifting apparatus. As the linear motors 174 and 176 extend, the motors will actuate limit switches LS-19 and LS-20 that achieve actuation of solenoid valve SV-6 that induces the fluid motor 84 to extend, thereby lowering the vacuum head of the tier lifting apparatus into engagement with the articles located therebeneath. The vacuum heads will engage the articles with sufficient mechanical pressure to deform the flexible skirts thereof to achieve positive sealed relation with the articles to ensure adherence of the articles to the vacuum heads. As the mechanical pressure applied by linear fluid motor 84 reaches sufficient magnitude, the pressure switch PS-2 will be actuated, thereby energizing vacuum switch VS-2 which in turn energizes vacuum valve VV-10 and ensures deenergization of vacuum valve VV-9 to selectively energize appropriate vacuum heads to achieve lifting of tier pattern B. The tier lifting and carriage transporting structure will then be actuated to move the lifted tier laterally and to lower the same into receiving relation on a pallet or container in the same manner as discussed above regarding tier pattern "A" after which the articles of the tier will be released and the tier lifting apparatus will be moved back to its position above the tier forming section as discussed above.

After tier patterns "A" and "B" have been formed and moved to an awaiting pallet or container, the stepping switch, or other memory circuit mechanism, will be returned to the starting position thereof thereby disposing the palletizing apparatus for the formation of another tier pattern "A" followed by tier pattern "B," and so on. After the tiers of articles have reached a predetermined number, the fully loaded pallet or container will be moved selectively or automatically by conveyor 162 away from the tier loading area. Another container or pallet then may be positioned manually or automatically on conveyor 162 at the tier loading area to receive further tiers of properly oriented articles.

FIG. 8 is a schematic illustration of electrical circuitry that may be employed for control of the palletizing apparatus of this invention. The circuitry is basically controlled by a memory circuit, that may be as indicated above, be a simple stepping switch capable of mounting the articles as they are moved serially through the palletizing apparatus by the various conveying mechanisms thereof and causing the palletizing apparatus to manipulate the various articles to achieve properly formed tier patterns that may be subsequently stacked in structurally stable manner onto a pallet or into a container. The stepping switch, if desired, may be of the type manufactured and sold commercially as the "MT" Series Step switch by the Bliss Eagle Signal Division of the E. W. Bliss Company of 736 Federal Street, Davenport, Iowa, 52803.

The stepping switch, or other appropriate memory circuit device, may be electrically connected to appropriate article feed conveyor circuitry, including limit switches that may, if desired be of the type manufactured by the Micro Switch Division of Honeywell, Freeport, Illinois, 61032 and identified in the Micro Switch Swtich Installation Sheet No. PK 81110.

Various solenoid valves that may be employed to control various functions of the article palletizing apparatus may be of the general type sold commercially as Series HC500 by Hannifin Pneumatic Division of Parker Hannifin, of Des Plains, Illinois.

Where vacuum valves may be employed to produce desirable vacuum control functions, it may be desirable to employ solenoid actuated valves such as those identified in Bulletin 8030 of the Automatic Switch Company, of 50–56 Hanover Road, Florham Park, New Jersey, 07932.

The stepping switch, or other memory circuit, is electrically connected to appropriate article feed conveyor circuitry, shuttle conveyor circuitry as well as electrical circuitry for the apparatus provided for rotation of selected ones of the articles. The memory circuitry is also disposed in controlling relation with circuitry causing the forming and lifting of tiers of articles as well as the circuitry provided for achieving conveyance and stacking of the tiers of articles.

An inspection circuit is provided, that may include photoelectric cells, for example, such as those manufactured by General Electric and sold commercially under Catalogue No. PS510. The inspection circuit is electrically communicated with tier forming and tier lifting circuitry to assure the formation and transfer of completed tiers of properly oriented articles.

In view of the foregoing, it is apparent that I have provided novel palletizing apparatus that is capable of orienting elongated articles loosely enclosed within plastic film containers and stacking the same into tier patterns of alternating mirror image relation. The ability of my apparatus to achieve effective palletizing of such containers is enhanced by the capability of the apparatus to conform plastic film containers to the configuration of the article being handled to facilitate orienting and stacking without interference by any loose plastic film material in which the articles may be enclosed. The palletizing apparatus of my invention is responsive to the presence of articles to be stacked in tiers and is also responsive to a memory circuit that may be a simple stepping switch of conventional nature or other appropriate electrical circuit apparatus, thereby lending the palletizing apparatus a capability of functioning properly even though the production flow of articles to be stacked may be irregular.

While my invention has been described herein as being particularly designed for development of specific tier patterns, it is not intended that my invention be limited to these specific tier apparatus, it being obvious that minor adjustment of the palletizing apparatus will be effective to cause the apparatus to produce tiers of articles of different tier configuration and to stack the same onto pallets or into containers without departing from the spirit and scope of the invention. Also, my invention is not to be in any manner limited by the nature of the article to be palletized. The invention will serve to palletize bags of material, cans, or any other articles capable of being lifted by vacuum head apparatus. It is apparent, therefore, that my invention is well adapted to attain all of the object hereinabove set forth together with other objects and advantages that will become obvious and inherent from the description of the apparatus itself.

It will be understood that certain combinations and subcombinations are of utility and may be employed without reference to other features and subcombinations. This is contemplated by and is within the scope of the appended claims. As many possible embodiments may be made of the invention without departing from the spirit or scope thereof, it is to be understood that all matters herein set forth or as shown in the accompanying drawings are to be interpreted as illustrative and not in a limited sense.

What is claimed is:

1. Apparatus for palletizing elongated generally rectangular articles into multi-article tiers of predetermined pattern comprising:
   a framework;
   a powered feed conveyor disposed adjacent said framework for conveying articles serially in linear manner from a production facility to said palletizing apparatus;
   a shuttle conveyor carried by said framework and being operative to transport articles serially in linear manner from said feed conveyor, said shuttle conveyor being normally disposed in a neutral position and being selectively movable laterally to either side of said neutral position to orient selected ones of said articles laterally with respect to the original line of movement thereof;
   means responsive to a tier pattern being formed and further responsive to the presence of one of said articles for selectively moving said shuttle conveyor;
   a transfer conveyor being carried by said framework and being operative to convey said articles linearly from said shuttle conveyor, one portion of said transfer conveyor defining a rotator station and another portion of said transfer conveyor defining a tier lifting station;
   article orienting means being carried by said framework above said transfer conveyor at said rotator station;
   pivot means being defined on said article orienting means and being disposed centrally of the linear path of said serially conveyed articles;
   article engaging and lifting means carried by said article orienting means and being offset upstream from said pivot and normally being disposed at a neutral position, said article engaging and lifting means being vertically reciprocatable to engage selected ones of said articles and to lift said articles from said transfer conveyor, said article engaging and lifting means being selectively rotatable clockwise or counterclockwise from said neutral position in an arc of 90° about said pivot inducing compound lateral and translational movement to said selected articles in accordance with the tier pattern being developed;
   tier lifting and transporting means carried by said framework in the vicinity of said tier lifting station and being operative in response to the presence of a completed tier to lift the tier from the transfer conveyor, move the tier linearly to clear said transfer conveyor and lower the tier to stack the same onto a pallet; and
   means responsive to the tier pattern being developed and further responsive to the presence of an article in association therewith for selecting the particular arcuate movement of said article engaging and lifting means.

2. The apparatus recited in claim 1 including:
   vacuum head means being carried by said article lifting means and being operative to secure said article to said article lifting means.

3. The apparatus recited in claim 2:
   said tier lifting apparatus comprising a movable carriage;
   a plurality of vacuum heads being carried by said carriage, part of said plurality of vacuum heads being employed to lift a tier of particular pattern, the remainder of said vacuum heads being employed to lift a tier of different pattern; and
   means for selectively activating said plurality of vacuum heads depending upon the tier pattern to be lifted and transported.

4. The apparatus recited in claim 3:
   said means for selectively activating said plurality of vacuum heads comprising a source of sub-atmospheric pressure;
   a first vacuum system communicating said source of sub-atmospheric pressure to said part of said plurality of vacuum heads;
   a second vacuum system communicating said source of sub-atmospheric pressure with said remainder of said plurality of vacuum heads;
   vacuum valve means for each of said first and second vacuum systems and being operative responsive to a particular tier pattern for activating said part of said vacuum systems and responsive to a different tier pattern for activating said remainder of said vacuum systems.

* * * * *

PO-1050
(5/69)

UNITED STATES PATENT OFFICE
CERTIFICATE OF CORRECTION

Patent No. 3,757,966           Dated September 11, 1973

Inventor(s) Thomas L. Cox, David G. Rodriguez

It is certified that error appears in the above-identified patent and that said Letters Patent are hereby corrected as shown below:

Col. 1, line 11, "arrnaged" should read --arranged--.

Col. 2, line 50, the words "illustrated the" should be omitted.
        line 50, after "illustrates" insert -- the general --.
Col. 4, line 48, "Operative" should read --Operation--.

Col. 9, line 19, "hole" should read --bale--.

Col. 11, line 3, "circiut" should read --circuit--.

Col. 14, line 19, the word "Swtich" should be omitted.

Col. 15, line 2, "apparatus" should read --patterns--.

Signed and sealed this 25th day of June 1974.

(SEAL)
Attest:

EDWARD M. FLETCHER, JR.
Attesting Officer

C. MARSHALL DANN
Commissioner of Patents